United States Patent
LaBarbera, Jr.

[11] Patent Number: 5,570,816
[45] Date of Patent: Nov. 5, 1996

[54] DRY BABY FORMULA MAKER

[76] Inventor: George LaBarbera, Jr., 81-576 Santa Clara Ct., Indio, Calif. 92201

[21] Appl. No.: 351,783

[22] Filed: Dec. 8, 1994

[51] Int. Cl.⁶ ............................................... B67D 5/56
[52] U.S. Cl. .......................... 222/129.4; 222/146.1; 99/470; 141/100
[58] Field of Search .................... 222/129, 129.1, 222/129.3, 129.4, 146.1, 146.2, 146.5, 190; 210/175, 181, 774; 99/470; 141/9, 82, 85, 99, 100

[56] References Cited

U.S. PATENT DOCUMENTS

| | | | |
|---|---|---|---|
| 2,660,351 | 11/1953 | Thompson | 222/129.4 |
| 3,352,460 | 11/1967 | Herring | 222/146.1 |
| 3,550,814 | 12/1970 | von Lersner | 222/129.3 |
| 4,191,101 | 3/1980 | Ogawa et al. | 141/100 |
| 4,357,861 | 11/1982 | Di Girolamo | 222/129.4 |
| 4,919,041 | 4/1990 | Miller | 99/279 |

*Primary Examiner*—Andres Kashnikow
*Assistant Examiner*—Lisa Douglas

[57] ABSTRACT

A device to be used for making and combining warm sterile water with dry baby formula. Device must contain a source of water (10), enough to fill at least one bottle to desired amount and to properly combine with formula. A heating device (30) is contained in order to sterilize water by boiling it. A cooling device (50) within the unit brings down the temperature of the water to recommended mixing temperature with dry formula. Enough dry formula is contained to produce at least one bottle. A releasing device is provided to release recommended amounts of both water and dry formula directly into a bottle.

5 Claims, 5 Drawing Sheets

5,570,816

DRY BABY FORMULA MAKER

BACKGROUND OF PRESENT INVENTION

This invention relates to beverage makers, specifically to be used for making dry baby formula, The problem exists that parents have many new responsibilities and expenses from their child that did not exist before their child was born. A large part of the problem is that babies must be fed approximately 5–6 times a day and in intervals of about four hours. These feedings proceed into the late night and early morning due to babies dietary needs. Attempting to lower their expenses many parents, when dealing with baby formula prefer to buy lower costing dry baby formula over more expensive premixed formula.

The problem with dry formula is that there are many inconvenient and time-consuming procedures to be done in order to prepare it, With premixed formula there are still procedures to be done to get the formula into the bottle and then warm it up to serving temperature. When a baby is crying to be fed even preparing more expensive premixed formula can be nerve racking. Dry formula preparation can be considerably more pain staking than premixed, and on top of that both can be even worse when preparing in the late evening and early morning.

The longest of the procedures to preparing either premixed or dry formula is heating of the formula or boiling of the water. Many people believe that taking warm water from the tap will suffice but they do not realize that baby's immune systems are still developing and require boiled water for their dry formula due to the fact that it must be sterile. Some parents attempt to shorten the preparing time of either dry or premixed formula by micro waving, but it has been discovered that many essential vitamins and minerals are removed from both types of formula in the process.

SUMMARY OF THE INVENTION

The present invention overcomes the stated problems by, decreasing the amount of procedures to be done, decreasing the time it takes to complete the procedures, uses the less expensive dry formula, and all while not removing the essential vitamins and minerals within the formula.

The present invention places all the necessary items with its means to make completed baby formula in a considerably small unit and makes it in a considerably shorter time with fewer procedures than anything that is available. At the push of a button water is pumped through the unit. The water first enters the heating unit. As it passes through the heating unit it is brought to boiling temperature in order to sterilize it. As the water is pumped out of the heating unit it automatically is pumped through the cooling unit bringing the temperature of the water to approximately 100 degrees Fahrenheit, the preferred temperature by most dry formula companies before adding dry formula. As the water is pumped out of the cooling unit at the proper temperature, it is released straight into the bottle. After the bottle is filled with warm sterilized water to the desired level, a second button is pressed releasing the proper measured amount of dry formula into the bottle. The remaining procedures are done manually by the operator, which are to cap the bottle and shake it. Shaking is done to mix the formula. When mixing is completed, the formula can be fed to the baby.

There are many devices made for making beverages such as the coffee machines and the ice tea machines but none are correctly formulated to make dry baby formula. They are incapable of both boiling and cooling water then releasing a correct amount of dry formula into a bottle. These stated problems make prior arts in this field irrelevant to this invention. There are devices that deal with baby formula but only deal with preserving or heating of already mixed baby formula and not the mixing.

This invention incorporates a shorter time of preparation, a decrease in the amount of procedures to be done, a complete unit, and all without losing essential vitamins and minerals by attempting to shorten preparing times incorrectly.

REFERENCE NUMBERS IN DRAWINGS

10 Water Tank
12 Tank Filling Door
14 Tank Washing Door
16 Tank Water Tube
18 Interlocking Tabs
20 Heating/Cooling unit
22 Connecting Water Tube
24 Interlocking Grooves
30 Heating/Pumping Unit
32 Metal Water Tubing
34 Heating Coils
36 Power Cord
30 Heating/Pumping Button
48 Tube Connector
50 Cooling Unit
52 Second Tube Connector
60 Formula/Bottle Containment Area
62 Releasing Water Tube
70 Formula/Water Funnel
72 Water Funnel Side
74 Formula Funnel Side
76 Bottle Containment Area
88 Formula Release Button
82 Electrical Connection
84 Formula Measuring/Releasing Device
86 Measured Full Side
88 Released Empty Side
90 Formula Filling Door
92 Door Hinges
94 Dry Formula Containment Area

BRIEF DESCRIPTION OF THE DRAWINGS

The present invention will be better understood from the following description in conjunction with the given drawings in which.

DETAILED DESCRIPTION OF THE DRAWINGS

Figure 1:
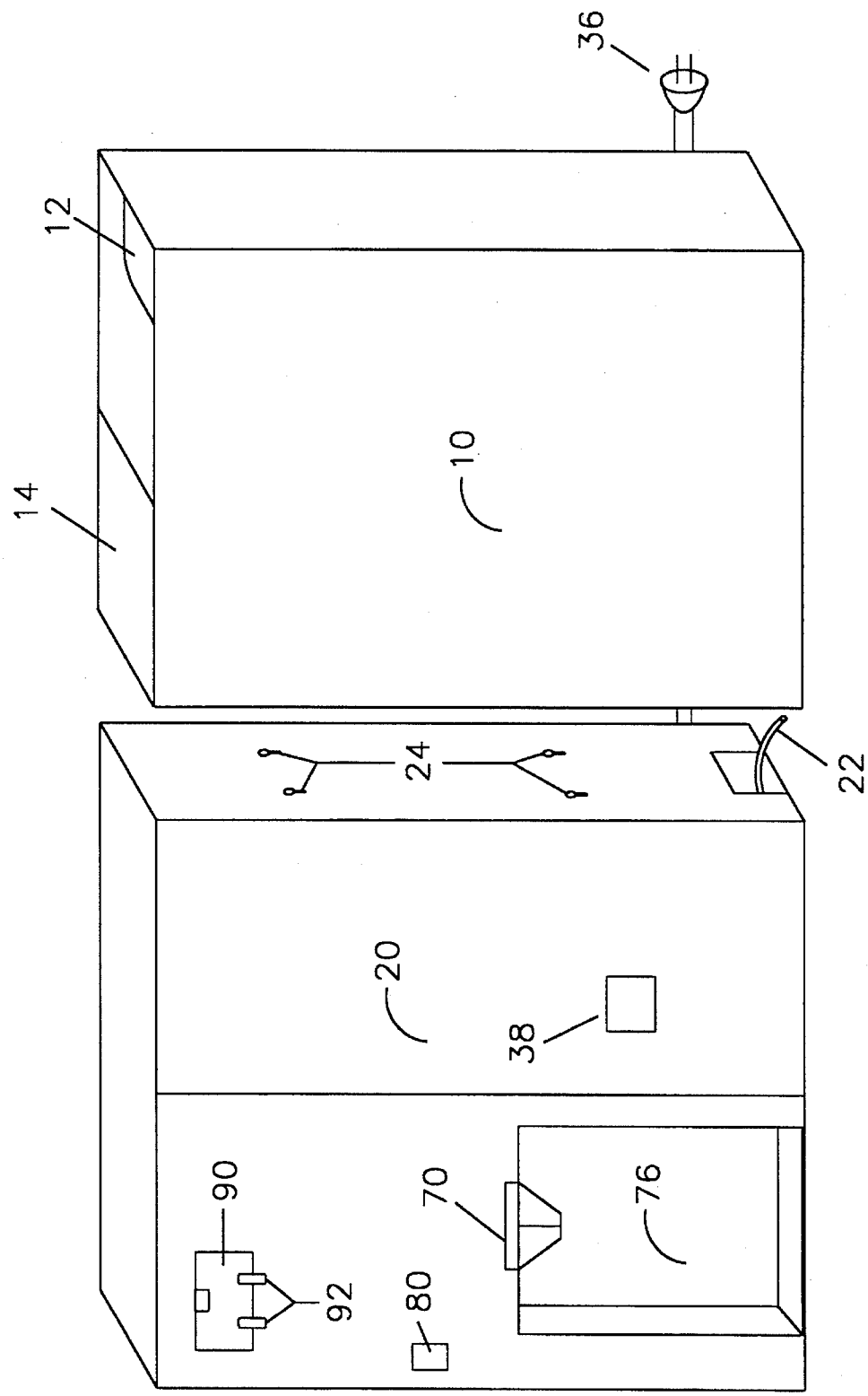
FIG. 1 is a perspective view of the outside front of a dry baby formula maker.
Figure 2:
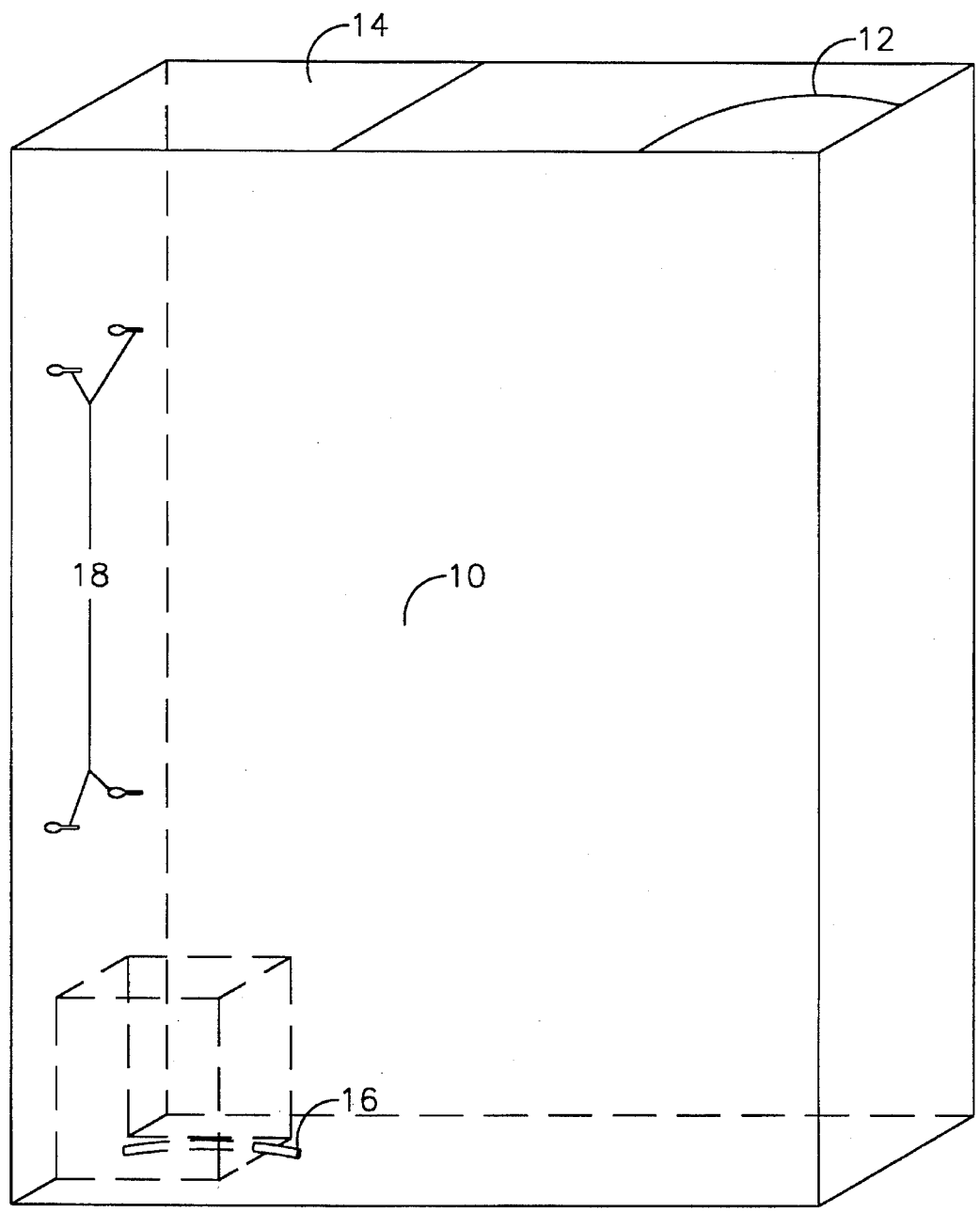
FIG. 2 is a drawing of a water tank which is a possible way of supplying the needed water for the dry formula.

In order to better understand and vision the present invention all major parts are shown and sectioned. All parts and sections are numbered by relation and are presented in order of sequence, Starting with FIG. 1 a perspective view is shown of a dry baby formula maker from the front outside. In the view shown the order of operation runs from right to left. First is shown a water tank 10 which attaches to the heating/cooling unit 20 by interlocking holes 24 and connecting the water hose 22. In the perspective shown the heating/cooling unit 20 is formed together with the formula/water dispenser unit 60. The formula/water dispenser unit 60 is where the process of making the dry formula ends and where the baby bottle holder 76 is located. In this area the sterilized water and dry formula are dispensed through a divided funnel 70 straight into the bottle.

To describe each portion of the present invention in more detail the invention is separated into like sections. Each section contains detailed drawings in conjunction with a written description.

The making of dry formula begins with water and is where the description begins. The present form of this invention uses a water tank 10 to store the needed amount of water to fill a numerous amount of bottles. The water tank 10 is filled by swinging open the door 12 on top of the tank. There is a second door 14 which is used for the cleaning of the tank to avoid bacteria buildup. The water tank 10 connects to the heating/cooling unit 20 through interlocking tabs 18 on the water tank 10 with locking grooves 24 on the heating/cooling unit 20. Plastic tubing 22 from the heating/cooling unit connects to tubing 16 from the water tank 10 to allow water to be passed through the rest of the unit. When the water tank 10 is completely connected, it may be filled through the swinging door 12.

Figure 3:
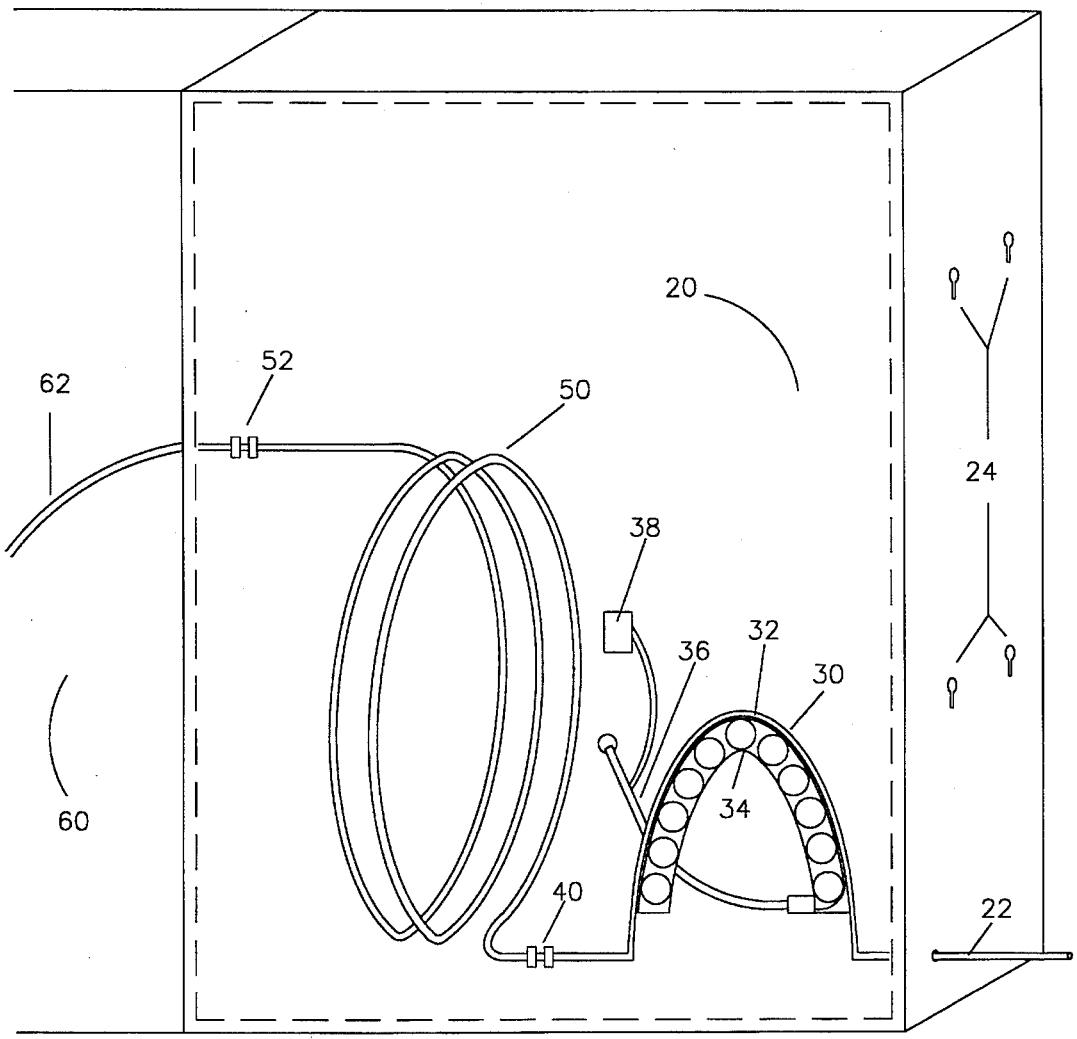
FIG. 3 is a view of the inside and outside of the heating/cooling section of the invention.

When the water tank is connected and filled the heating/pumping button 30 in FIG. 3 is pressed. When this button is pressed power is turned on to the unit which comes from the power cord 36 which is plugged into a household outlet. When the heating/pumping unit 30 receives power, the heating coils 34 use the electricity to heat up to the boiling temperature of water (212 Degrees). When boiling temperature is reached the unit begins to pump water out of the water tank 10 and over the heating coils 34 in connected metal tubing 32. When the water has passed over the heating coils 34 it reaches boiling temperature and is sterilized.

After the water has been sterilized, it is connected with a tube connector 40 and pumped through the cooling unit 50 which in this proposed embodiment is 10 ft of copper tubing. As small amounts of hot water pass through the tubing, the heat is absorbed by the copper which is a material with a high level of heat transfer. With the correct amount of copper tubing the water is brought down to the recommended temperature (100 degrees) for water before mixing with dry formula.

Figure 4:
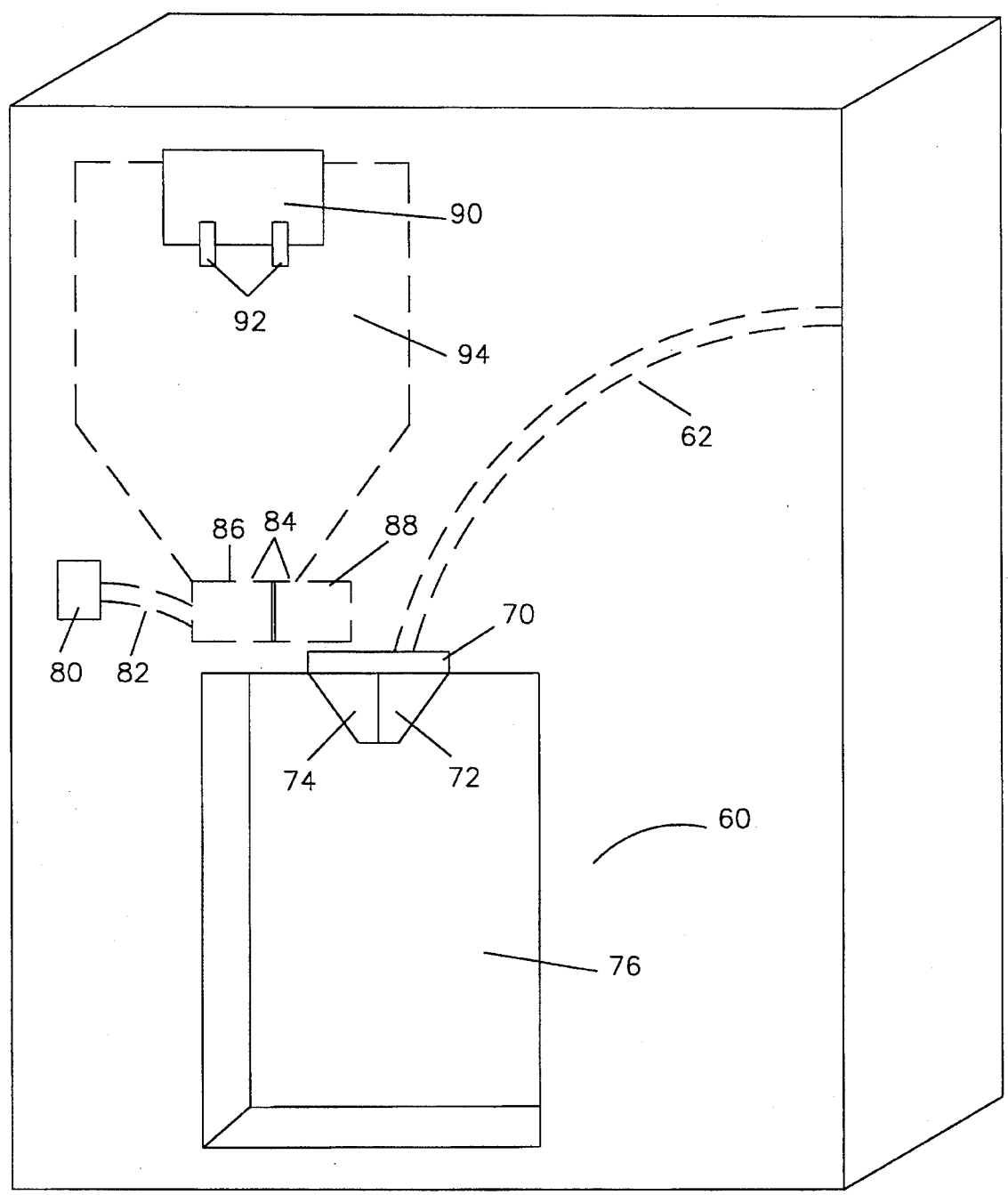
FIG. 4 is a view of the dry formula containment area with a measuring device together with the bottle holding area.

As the proper temperature water leaves the cooling unit 50 it is connected with a second tube connector 52 and pumped into the dry formula containment area 60, shown in FIG. 4, with plastic tubing 62. The water then is released from the tube 62 into a divided funnel 70 with one side for water 72 and a second side for dry formula to keep the two from mixing and clogging the unit. The funnel releases the sterile proper temperature water directly into a baby bottle held in the bottle containment area 76.

The next steps deal with the dry formula part of the mixture. The dry formula containment area 94 should first be filled by opening the hinged 92 door 90 on the top front of the unit and then emptying the dry formula container in which it came into this area. When the bottle is filled to the proper level with water, the formula release button 80 is pressed. When pressed it is electrically connected 82 with the formula measuring/releasing device 84. The formula measuring/releasing device 84 has two sides, a full side 86 and an empty side 88. When the button 80 is pressed the device 84 turns 180 Degrees. The empty side 84 is filled with the proper amount of dry formula in comparison to the bottle and the full side 86 releases the proper amount of dry formula into the funnel 70. The formula is then funneled down the formula side of the funnel 74 and directly into the baby bottle in the baby bottle containment area 76.

Figure 5C:
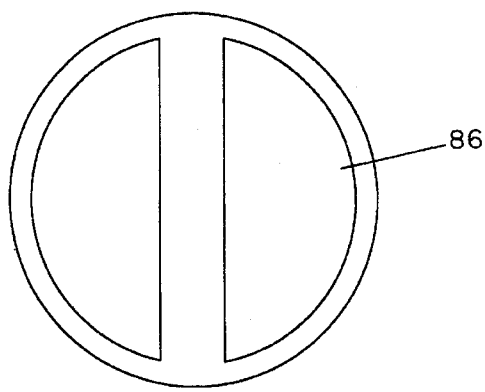
FIG. 5 shows a detailed view of a possible formula measuring device.
Figure 5B:
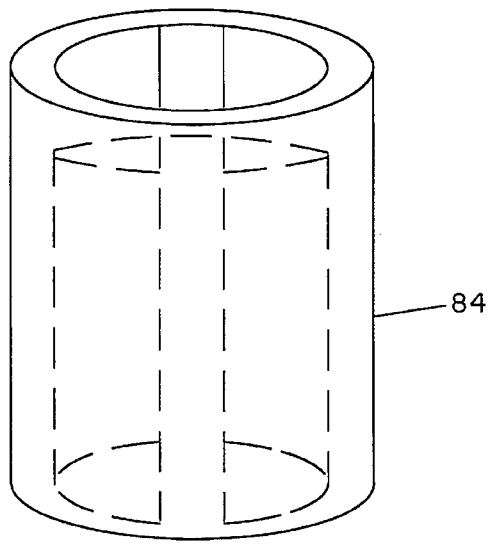
Figure 5A:
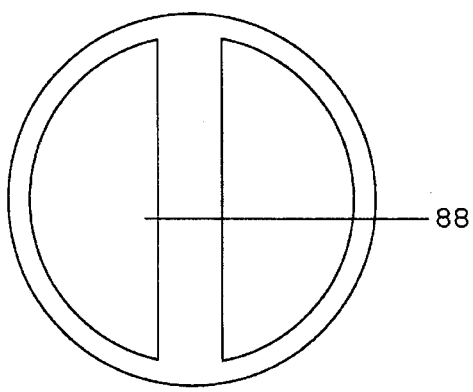

FIG. 5 is a detailed drawing of the formula measuring/releasing device. Three views are shown, one is a standing three-dimensional view of the device 84 and the other two are different top views of the device 84a, 84b. The above top view 84a shows how the casing might appear and the opening for the formula for a 8 oz serving of formula and the bottom top view 84b shows how the casing of the device can remain the same but the dimensions of the openings can be changed, such as smaller as shown, for possibly a 6 oz serving of formula or as desired.

Figure 6B:
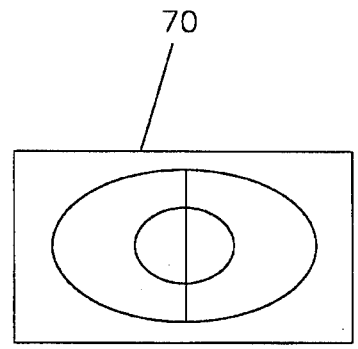
FIG. 6 shows a detailed view of a formula/water funnel.
Figure 6A:
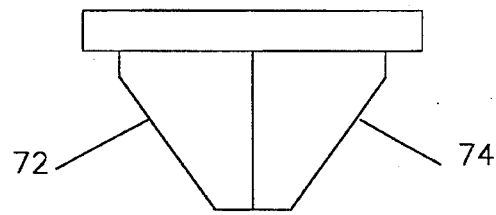

FIG. 6 is a detailed drawing of the divided funnel 70. On the left side is shown a top view of the divided funnel 70. On the right side is shown a side view of the divided funnel 70. The reason the funnel is divided into a formula side 74 and a water side 72 is because if water was left in the funnel 70 when the formula came through it would most likely clog. The funnel 70 is necessary to maintain the flow of both water and formula directly into the baby bottle. The funnel 70 in this proposed embodiment is also removable so it may be washed and it can easily be replaced if need be.

Accordingly the reader will see that the dry baby formula maker is very useful for any one that deals with dry formula. By reducing the procedures to be done to the pressing of buttons and shortening the preparing and serving time do to the procedures and devices used. The correct time reducing procedures are also used in order to assure the recipient of the formula will get all the essential vitamins and minerals from within the formula. And the user of the device has all their needed materials within one unit.

Although the description above contains many specificity's, these should not be construed as limiting the scope of the invention but as merely providing illustrations of some of the presently preferred embodiments of this invention. For example, a clock may be added such as are found on many presently available coffee makers which allows the machine at a preset time to turn itself on and do all the necessary procedures before the user arrives; the top portion can be shaped to hold bottles for later use; the water tank can be replaced with a water line which runs to a sink or directly into a wall which is possibly how businesses may wish to keep in their bathrooms such as other convenient machines like baby changers, etc.

Thus the scope of the invention should be determined by the appended claims and their legal equivalents, rather than by the examples given.

I claim:

1. A device preparing baby formula which combines portioned powder baby formula with proper temperature, sanitized water, comprising:

a containment area for holding powder baldy formula;

a heating device for boiling and pumping water through the device:

a cooling device connected to said heating device, that receives said boiling water and cools it to a desired temperature: and a means for receiving a measured amount of powder baby formula from said containment area and releasing it into a bottle containment area, said bottle containment area also receiving the cooled water for combining the two ingredients.

2. The device for preparing baby formula according to claim 1, wherein said heating device comprises heating coils.

3. The device for preparing baby formula according to claim 1, wherein said cooling device comprises copper tubing.

4. The device for preparing baby formula according to claim 1, wherein said means for receiving a measured amount of the powder baby formula is capable of measuring and releasing the powder baby formula at manufacturer recommended amounts of the powder baby formula.

5. The device for preparing baby formula according to claim 1, wherein the bottle containment area comprises a bisectioned funnel at an upstream end, and having one section of the funnel for receiving the powder baby formula and the other section for receiving the cooled water.

* * * * *